E. BELLINI & A. TOSI.
DIRECTED WIRELESS TELEGRAPHY.
APPLICATION FILED MAR. 2, 1909.
948,086.
Patented Feb. 1, 1910.
FIG_1_
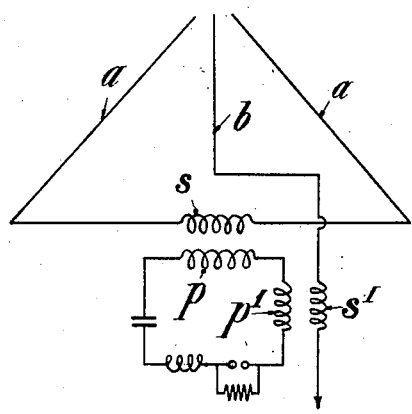
FIG_2_
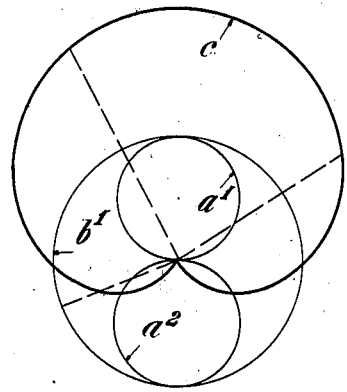
FIG_3_
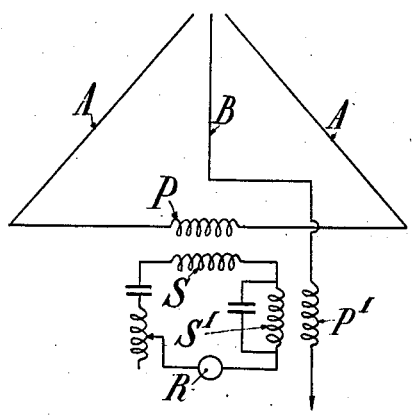
FIG_4_
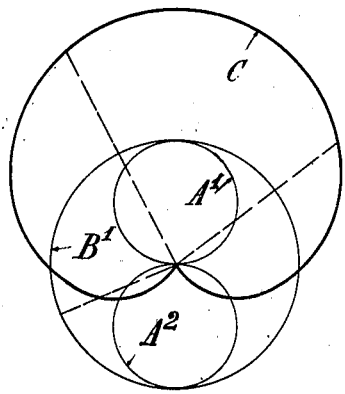
WITNESSES
INVENTORS
Ettore Bellini
Alessandro Tosi

UNITED STATES PATENT OFFICE.

ETTORE BELLINI AND ALESSANDRO TOSI, OF PARIS, FRANCE.

DIRECTED WIRELESS TELEGRAPHY.

948,086.  Specification of Letters Patent.  Patented Feb. 1, 1910.

Application filed March 2, 1909. Serial No. 480,815.

*To all whom it may concern:*

Be it known that we, ETTORE BELLINI and ALESSANDRO TOSI, subjects of Italy, residing at 4 Rue du 29 Juillet, Paris, in the Republic of France, have invented new and useful Improvements in Directed Wireless Telegraphy, of which the following is a specification.

Systems of directed wireless telegraphy are known, which allow of emitting electric waves principally in a predetermined direction, and also of ascertaining, at the transmitting station, the direction of an unknown station emitting waves, and of receiving the waves according to said direction. At the transmitting station, however, the waves are not only transmitted in the direction in which it is desired to send them, but also in the diametrically opposite direction, which is of course a serious disadvantage. Similarly, at the receiving station, though it is possible to ascertain the line which traverses both stations, it is not possible to determine in what direction, along that line, the transmitting station is located, and in most cases information on this point is essential. Moreover, it is impossible to prevent the reception of waves from both directions.

The present invention provides means applicable to the transmitter and the receiver in all systems of directed wireless telegraphy, which obviate the disadvantages referred to, and which enable a transmitter to direct waves solely toward a particular receiver, and a receiver to receive waves only from a selected direction and to absolutely ascertain the direction in which an unknown transmitter is located. These means consist, both as regards the transmitter and the receiver, in combining with the dirigible system a uniformly radiating system the aerial part of which is arranged substantially coincident to the symmetrical axis of the aerial of the dirigible system.

For transmission, the amplitudes of the fields of the two systems must be equal or approximately equal and the field generated by the uniform system must be approximately in phase with or in opposite phase to, the fields generated by the dirigible system.

For receiving, the actions of both systems on the cymoscope must be approximately equal, and must also be approximately in phase or in opposite phase.

In the annexed drawing Figure 1 diagrammatically illustrates an example in which the invention is applied to a transmitting apparatus. Fig. 2 represents the diagram which allows of determining the resultant electromagnetic field produced by the transmitting apparatus to which the invention is applied. Fig. 3 shows an example of the invention applied to a receiving apparatus. Fig. 4 is a diagram illustrating the resultant action of the receiving system on the cymoscope.

1. *Transmission.*—In the example shown in Fig. 1 the aerial of the dirigible transmitting system is an oscillation circuit which is designated $a$. In or near the symmetrical axis of the aerial part of this dirigible system the antenna or aerial part $b$ of a uniformly radiating system $b$ is arranged. The two secondaries $s$ and $s^1$ are excited by the primaries $p$ and $p^1$. With this combination the circular electromagnetic field due to the aerial $b$ is superposed on the electromagnetic field due to the aerial $a$ of the dirigible system. If the amplitudes of the fields of the two systems are substantially equal and if the field generated by the uniform system is substantially in phase with or in opposition to the fields generated by the dirigible system, the resultant field will have a maximum and minimum intensity of the same direction, one at one side of the apparatus and the other at the opposite side. The direction of the maximum radiation can be ascertained, in any given installation, either by observation of the coils $s\ p$, $s^1\ p^1$, or by preliminary observation of what takes place in a known receiver to which the transmission is made. When in this receiver the maximum action is observed it will be known in what direction the aerial of the dirigible system must be arranged in order to transmit, with the maximum effect, to any receiver.

Fig. 2 diagrammatically indicates the intensities of the three fields:—$a^1\ a^2$ is the field due to the system $a$; $b^1$ is the field due to the system $b$, and $c$ is the resultant field. It will be seen in this diagram that the amplitudes of the fields of the two systems are equal, that is to say that the maximum vector radii in the diagram of the dirigible system and in the circular diagram of the uniformly radiating system are equal. This is the most favorable condition, since the resultant field is then *nil* in the direction opposed to that in which transmission is to take place, but this state of equality may to a certain extent be departed from, since the amplitudes of the fields may not be equal, as has already been indicated. The resultant diagram $c$ is obtained by considering the field of the uniformly radiating system, represented by $b^1$, as in phase with the field due to the dirigible system at one side of the apparatus, represented by the half-diagram $a^1$. The curve $b$ is then obtained by adding to the uniform radii of $b^1$ which traverse $a^1$ the corresponding vector radii of $a^1$, and by taking from the uniform radii which traverse $a^2$ the corresponding vector radii of $a^2$.

2. *Reception.*—In the example shown in Fig. 3 the aerial of the dirigible receiving system is a closed oscillation circuit A. With this dirigible receiving system is combined a uniformly radial receiving system the aerial B of which is substantially in the symmetrical axis of the aerial of the dirigible system. The installation is completed by two primary coils P and $P^1$ and by two secondary coils S and $S^1$ connected to the cymoscope R. When waves act on this apparatus a current is produced in the aerial of each of the two systems, and these currents act simultaneously (for example by induction, as in the case illustrated) on the cymoscope R. The resultant action on the cymoscope differs from that which would be produced by the systems acting separately. If the actions of the two receiving systems on the cymoscope are equal and in phase, the maximum effect will be produced on the cymoscope; if the said actions are equal but opposite the minimum effect will be produced. If a transmitter is moved in a circle around the receiver, the intensity and phase of the uniformly radiating system remain constant whereas the intensity of action on the dirigible receiving system has two maxima and two minima, and its phase changes through 180 degrees. If the effects of the two systems on the cymoscope are brought into phase, they are added when the transmitter is in the plane of the dirigible circuit, on one side; if the phases are brought into opposition they are subtracted when the transmitter is in the plane of the dirigible circuit on the other side. If therefore in the first instance the receiver is acted on by a transmitter the position of which is known the connections, intensities, and phases of the effects can be so regulated that the maximum resultant effect on the receiver is produced when this transmitter is in the plane of the dirigible circuit. It will then be known which side of the dirigible system must be directed toward the transmitter in order to obtain the maximum effect. Thereafter, when messages are received from unknown transmitters, the position in which the dirigible system must be placed in order to obtain the maximum effect will in each case indicate the direction of the transmitter. The direction of the transmitter can also be ascertained by direct observation of the coils P S, $P^1$ $S^1$ without preliminary tests. An installation of this kind can also be used to find the direction of the transmitter even if the effects of the two systems on the cymoscope are not perfectly equal and not exactly in phase or in opposition.

The diagram marked Fig. 4, which is identical with that marked Fig. 2 illustrates at $A^1$ $A^2$, $B^1$ and C in the case of the reception the partial effects of the two independent receiving systems and of the resultant effect on the cymoscope. The resultant diagram C is obtained by taking the effect on the cymoscope of the uniformly radiating system as equal and in phase with the effect on the cymoscope of the dirigible system illustrated by the half diagram $A^1$ and as equal and opposed in phase to the effect on the cymoscope of the dirigible system illustrated by the half diagram $A^2$. The points of the curve C will consequently be obtained by adding to the uniform radii of $B^1$ which traverse $A^1$ the corresponding vector radii of $A^1$, and by subtracting from the uniform radii of $B^1$ which traverse $A^2$ the corresponding vector radii of $A^2$.

Having now described our invention, what we claim as new and desire to secure by Letters Patent is:

Means applicable to the transmitting and receiving apparatus in all systems of directed wireless telegraphy consisting in the combination of a dirigible system and a uniformly radiating system the aerial part of which is arranged substantially coincident to the symmetrical axis of the aerial of the dirigible system and the electric action of which is substantially in phase or in opposition to that of the dirigible system and has equal or substantially equal amplitudes to those of the electric action of the said dirigible system, substantially as described and for the purpose set forth.

In testimony whereof we have signed our names to this specification in the presence of two subscribing witnesses.

ETTORE BELLINI.
ALESSANDRO TOSI.

Witnesses:
  LOUIS MOSES,
  H. C. COXE.